United States Patent
Ohno et al.

(10) Patent No.: US 12,043,195 B2
(45) Date of Patent: Jul. 23, 2024

(54) AIRBAG DEVICE AND PASSENGER PROTECTION DEVICE

(71) Applicant: TOYOTA JIDOSHA KABUSHIKI KAISHA, Toyota (JP)

(72) Inventors: Mitsuyoshi Ohno, Miyoshi (JP); Takeshi Yamamoto, Toki (JP); Toshiki Iwama, Toyota (JP); Yoshito Kusuhara, Ichinomiya (JP); Tsutomu Ishii, Ichinomiya (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 18/242,590

(22) Filed: Sep. 6, 2023

(65) Prior Publication Data
US 2024/0123932 A1    Apr. 18, 2024

(30) Foreign Application Priority Data
Oct. 14, 2022   (JP) ................. 2022-165754

(51) Int. Cl.
| B60R 21/207 | (2006.01) |
| B60R 21/233 | (2006.01) |
| B60R 21/2338 | (2011.01) |
| B60R 21/264 | (2006.01) |

(52) U.S. Cl.
CPC .......... *B60R 21/207* (2013.01); *B60R 21/233* (2013.01); *B60R 21/264* (2013.01); *B60R 2021/23308* (2013.01); *B60R 2021/23386* (2013.01)

(58) Field of Classification Search
CPC ............... B60R 21/207; B60R 21/233; B60R 2021/23386
See application file for complete search history.

(56) References Cited

U.S. PATENT DOCUMENTS

| 10,005,417 | B2* | 6/2018 | Ohno ................. B60R 21/2334 |
| 10,189,431 | B2* | 1/2019 | Yamamoto ............ B60R 21/237 |
| 2019/0016293 | A1 | 1/2019 | Saso |
| 2020/0238941 | A1* | 7/2020 | Saso ..................... B60R 21/214 |
| 2022/0388472 | A1* | 12/2022 | Hwangbo ......... B60R 21/23138 |

FOREIGN PATENT DOCUMENTS

| JP | H04-212651 A | | 8/1992 |
| JP | 2005088675 A | * | 4/2005 |
| JP | 2016-020174 A | | 2/2016 |
| JP | 2016203945 A | * | 12/2016 |
| JP | 2019-018593 A | | 2/2019 |
| JP | 2019-218013 A | | 12/2019 |

* cited by examiner

*Primary Examiner* — Faye M Fleming
(74) *Attorney, Agent, or Firm* — Dinsmore & Shohl LLP

(57) ABSTRACT

An airbag device includes an airbag that is supplied with gas generated by an inflator during a vehicle collision, and that inflates and deploys from a rear side of a vehicle seat toward a front side via an upper side. In an inflated and deployed state, the airbag includes a pair of front-rear chambers extending in a seat front-rear direction via left and right sides of a head of a passenger, an airbag body that is communicated with the pair of front-rear chambers and that is disposed at a front side of the passenger between the pair of front-rear chambers, and an auxiliary chamber into which gas inside the airbag body flows indirectly at least during restraint of the passenger by the airbag body.

8 Claims, 13 Drawing Sheets

AIRBAG DEVICE AND PASSENGER PROTECTION DEVICE

CROSS-REFERENCE TO RELATED APPLICATION

This application is based on and claims priority under 35 USC 119 from Japanese Patent Application No. 2022-165754 filed on Oct. 14, 2022, the disclosure of which is incorporated by reference herein.

BACKGROUND

Technical Field

The present disclosure relates to an airbag device and to a passenger protection device including an airbag device.

Related Art

For example, an airbag device disclosed in Japanese Patent Application Laid-Open (JP-A) No. 2019-018593 includes an inflator that generates gas at high pressure during a shock input, and a bag body that inflates and deploys from a seatback of a vehicle seat on receipt of gas supplied from the inflator. The bag body includes a truck support section that deploys at an opposite side of a trunk of a passenger seated in the vehicle seat to the seatback side of the trunk, and a pair of head support sections that respectively deploy at each seat width direction side of the head of the passenger and that connect to the truck support section. In a deployed state, an escape portion avoiding the head of the passenger is formed in the bag body so as to pass through in a height direction between the pair of head support sections.

For example, an airbag device disclosed in JP-A No. 2019-218013 includes an inflator, and an airbag that is deployed by gas supplied from the inflator. The airbag includes a rear inflation portion that deploys at a back face side of a seat, a pair of side inflation portions that extend toward a front side from both width direction sides of the rear inflation portion, and a pair of front inflation portions that extend from the pair of side inflation portions toward a center therebetween, that are mutually coupled together at the center side, and that cover across the front of the passenger. A gas pathway is formed through this airbag for gas to flow in the sequence of the rear inflation portion, the side inflation portions, and the front inflation portions.

An airbag body (bag body, airbag) of an airbag device such as described above is configured so as to envelop and restrain the upper body of a passenger. Thus in cases in which, to raise the passenger restraint performance, vent holes are set for externally exhausting high temperature gas supplied from the inflator into the airbag body, there is a concern regarding a possibility of the passenger suffering from burns due to the exhausted high temperature gas.

Moreover, in cases in which an airbag device is provided at a rear seat, when vent holes are set in a front face of the inflated and deployed airbag body, there is a concern regarding a possibility of the airbag body abutting the seatback of a front seat, and the vent holes being occluded such that gas is not able to be externally exhausted.

Moreover, when vent holes are set on a top face of the inflated and deployed airbag body, there is a concern regarding a possibility of the airbag body abutting a ceiling of a vehicle cabin, and the vent holes being occluded such that gas is not able to be externally exhausted.

SUMMARY

The present disclosure obtains an airbag device capable of discharging gas from inside an airbag body even though no vent holes are set for external exhausting of gas, and a passenger protection device including the same.

An airbag device of a first aspect includes an inflator that generates gas during a vehicle collision, and an airbag that is supplied with gas generated by the inflator, and that inflates and deploys from a seat rear side of a vehicle seat toward a seat front side via a seat upper side. In an inflated and deployed state the airbag includes a pair of front-rear chambers extending in a seat front-rear direction via left and right sides of the head of a passenger seated in the vehicle seat, an airbag body that is communicated with the pair of front-rear chambers and that is disposed at a seat front side of the passenger between the pair of front-rear chambers, and an auxiliary chamber into which gas inside the airbag body flows either directly or indirectly at least during restraint of the passenger by the airbag body.

In the first aspect, gas generated by the inflator during a vehicle collision is supplied into the airbag, and the airbag inflates and deploys from the seat rear side of the vehicle seat toward the seat front side thereof via the seat upper side thereof. In the inflated and deployed state the airbag includes the pair of front-rear chambers extending in a seat front-rear direction via the left and right sides of the head of the passenger seated in the vehicle seat, and the airbag body that is communicated with the pair of front-rear chambers and that is disposed at the seat front side of the passenger between the pair of front-rear chambers.

The airbag also includes the auxiliary chamber into which gas inside the airbag body flows either directly or indirectly at least during restraint of the passenger by the airbag body. Thus gas is discharged from inside the airbag body even without vent holes being set to externally exhaust gas. The passenger restraint performance is raised thereby. Moreover, the passenger does not suffer burns due to high temperature gas not being externally exhausted. Note that reference here to "during a vehicle collision" encompasses cases in which the inevitability of a collision is foreseen (predicted).

An airbag device of a second aspect is the airbag device of the first aspect, wherein the front-rear chamber includes a pair of front-rear extension portions disposed at the left and right sides of the head of the passenger and a coupling portion that connects seat front side end portions of the pair of front-rear extension portions together in a seat width direction, and the airbag body is provided at the coupling portion so as to be inflated and deployed toward a seat rear side when supplied with the gas through a communication hole formed in the seat rear side of the coupling portion.

In the second aspect the front-rear chambers include the pair of front-rear extension portions disposed at the left and right sides of the head of the passenger and the coupling portion that connects seat front side end portions of the pair of front-rear extension portions together in the seat width direction. The airbag body is provided at the coupling portion so as to be inflated and deployed toward a seat rear side when supplied with the gas through the communication hole formed in the seat rear side of the coupling portion. Namely, the airbag body inflates and deploys delayed with respect to the front-rear chambers. The airbag body is thereby prevented from getting stuck in a gap between the passenger and the ceiling of the vehicle cabin during inflation and deployment of the front-rear chambers, enabling a deployment malfunction to be suppressed or prevented from occurring in the airbag.

An airbag device of a third aspect is the airbag device of the second aspect, wherein the auxiliary chamber is formed as a pair of left-right symmetrically shaped auxiliary chambers having substantially triangular shapes and provided between the pair of front-rear extension portions and the coupling portion.

In the third aspect, the auxiliary chamber is formed as the pair of left-right symmetrically shaped auxiliary chambers having substantially triangular shapes and provided between the pair of front-rear extension portions and the coupling portion. Namely, coupling between the airbag body through the coupling portion and the pair of front-rear extension portions is performed by the auxiliary chambers. Thus in addition to the operation and effects of the first aspect, when the airbag body has been completely deployed, the airbag body is suppressed by auxiliary chambers from swinging in the seat height direction.

An airbag device of a fourth aspect is the airbag device of the third aspect, wherein the airbag includes two front-rear chamber panels that are sewn together and are also respectively sewn to respective peripheral edge portions of the pair of auxiliary chambers, and includes a single airbag body panel sewn to the coupling portion.

In the fourth aspect, the airbag includes the two front-rear chamber panels that are sewn together and are also respectively sewn to respective peripheral edge portions of the pair of auxiliary chambers, and includes the single airbag body panel sewn to the coupling portion. The airbag is accordingly a simple configuration and is able to be manufactured at low cost.

An airbag device of a fifth aspect is the airbag device of the second aspect, wherein the auxiliary chamber is provided at an upper portion of the airbag body so as to oppose a ceiling of a vehicle cabin in a seat height direction.

In the fifth aspect, the auxiliary chamber is provide to the upper portion of the airbag body so as to oppose the vehicle cabin ceiling in the seat height direction. Thus similar operation and effects to those of the first aspect are obtained.

An airbag device of a sixth aspect is the airbag device of the fifth aspect, wherein the auxiliary chamber is configured so as to abut the ceiling at least during restraint of the passenger by the airbag body.

In the sixth aspect, the auxiliary chamber abuts the ceiling at least during restraint of the passenger by the airbag body. Thus in addition to similar operation and effects to those of the first aspect, the airbag body is also suppressed from swinging in the seat height direction by the auxiliary chamber.

An airbag device of a seventh aspect is an airbag device of a fifth aspect or a sixth aspect, wherein the airbag includes two front-rear chamber panels that are sewn together, a single airbag body panel sewn to the coupling portion, and three auxiliary chamber panels that are sewn to the airbag body panel.

In the seventh aspect, the airbag includes the two front-rear chamber panels that are sewn together, the single airbag body panel sewn to the coupling portion, and the three auxiliary chamber panels that are sewn to the airbag body panel. The airbag is accordingly a simple configuration and is able to be manufactured at low cost.

A passenger protection device of an eighth aspect includes a vehicle seat for a passenger to sit on, and the airbag device of any one of the first to seventh aspects installed at a location at a seat rear side of the vehicle seat.

In the eighth aspect, the airbag device is installed at the location at the seat rear side of the vehicle seat for the passenger to sit on. This airbag device is the airbag device of any one of the first to seventh aspects, and so similar operation and effects are obtained to those of the first to seventh aspects.

Thus as described above, the present disclosure enables gas to be discharged from inside an airbag body even without setting vent holes for external exhausting gas.

BRIEF DESCRIPTION OF THE DRAWINGS

Exemplary embodiments of the present disclosure will be described in detail based on the following figures, wherein.

DETAILED DESCRIPTION

Figure 1:
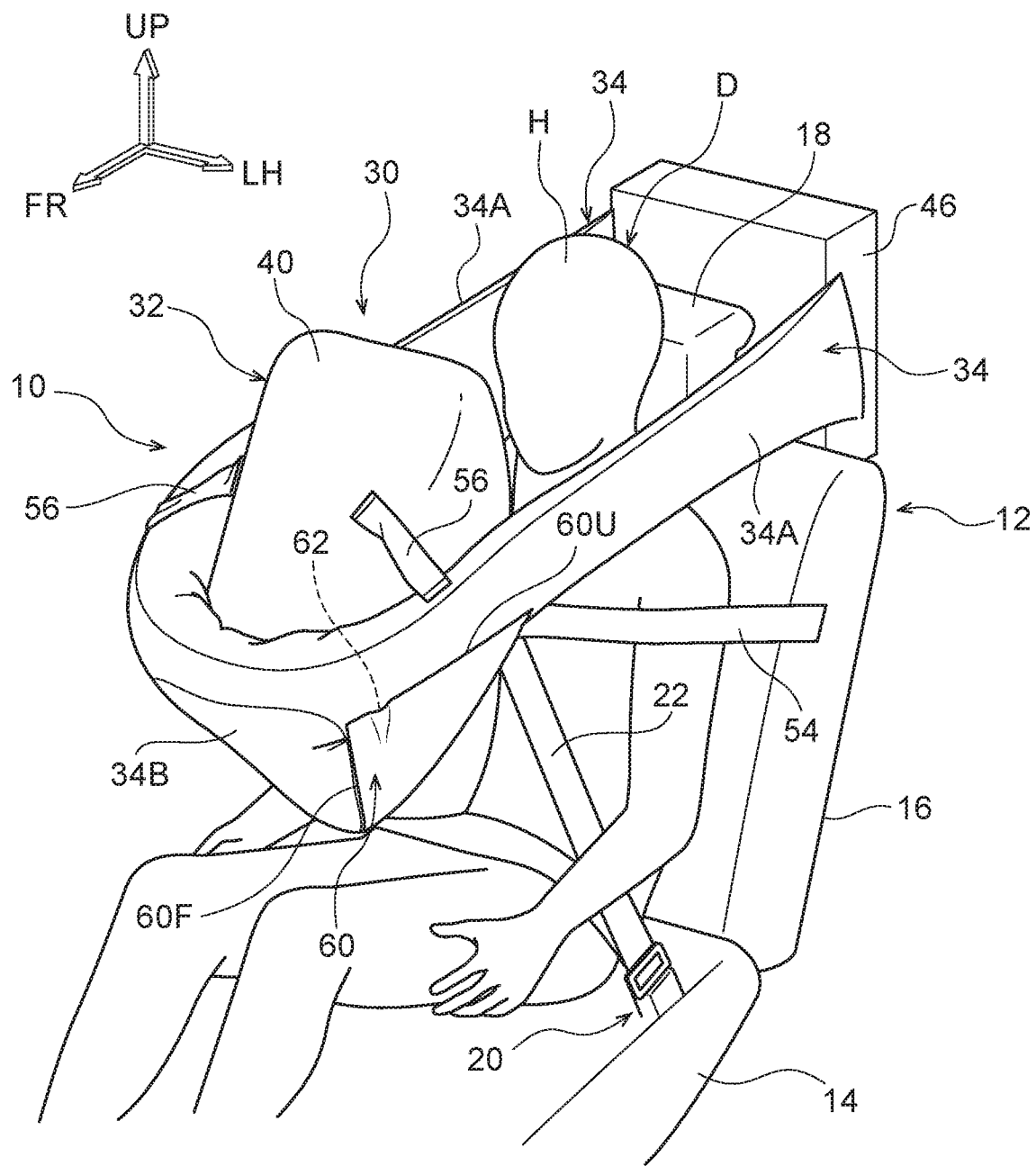
FIG. 1 is a schematic perspective view illustrating an inflated and deployed state of an airbag in an airbag device of a passenger protection device according to a first exemplary embodiment.

Detailed explanation follows regarding exemplary embodiments of the present disclosure, with reference to the drawings. Note that for ease of explanation, in the drawings an arrow UP indicates an upward direction of a vehicle and a vehicle seat, an arrow FR indicates a forward direction of a vehicle and a vehicle seat, an arrow RH indicates a right direction of a vehicle and a vehicle seat, and an arrow LH indicates a left direction of a vehicle and a vehicle seat. Thus in the following description, unless stated otherwise, reference to up and down, front and rear, and left and right directions indicate up and down, front and rear, and left and right directions of a vehicle and a vehicle seat. Moreover, a left-right direction has the same definition as a vehicle width direction and a seat width direction.

First Exemplary Embodiment

First description follows regarding a first exemplary embodiment. As illustrated in FIG. 1, a passenger protection device 10 according to the first exemplary embodiment includes a vehicle seat 12 and an airbag device 30. The vehicle seat 12 is a front seat or a rear seat of a vehicle (automobile). In this example the vehicle seat 12 is a rear seat and not a front seat 13 (see FIG. 5 to FIG. 7). The vehicle seat 12 includes a seat cushion 14, a seatback 16 rotatably provided at a rear edge of the seat cushion 14, and a headrest 18 provided at an upper edge of the seatback 16 so as to be capable of being raised and lowered.

Note that in FIG. 1 etc., a state is illustrated in which a crash test dummy (person dummy) D is seated on the seat cushion 14 of the vehicle seat 12, as a model of a passenger (seated person) to be protected. The dummy D is, for example, an America male adult 50 percentile (AM50) head-on collision test dummy (Hybrid III). The dummy D is seated in a standard seated posture as determined by the crash test method, and the vehicle seat 12 is positioned at a standard installation position corresponding to the seated posture. For ease of explanation, the person dummy D will be hereafter be called "passenger D".

Figure 2:
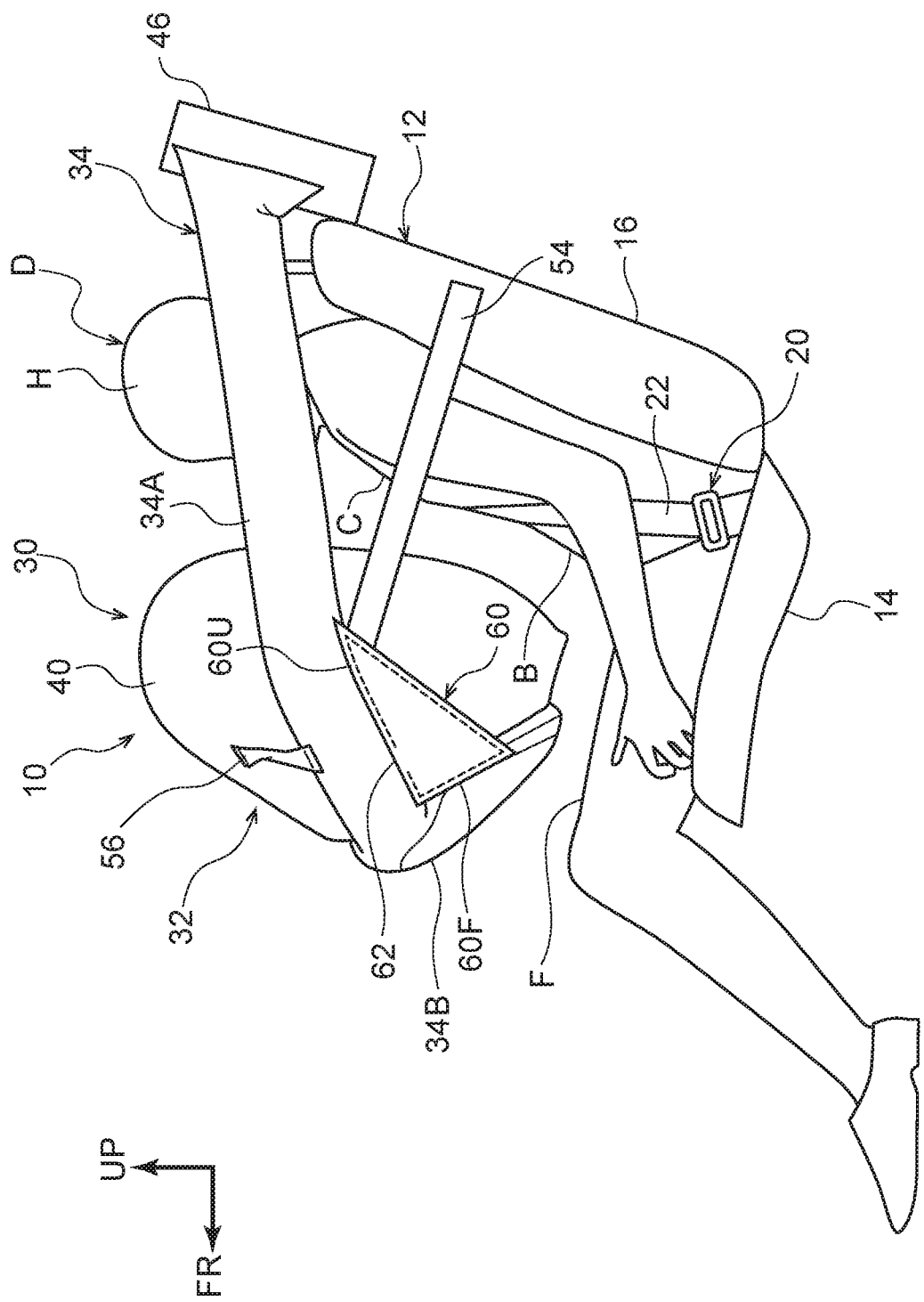
FIG. 2 is a schematic side view illustrating an inflated and deployed state with respect to a passenger of an airbag of an airbag device of a passenger protection device according to the first exemplary embodiment.

As illustrated in FIG. 1 and FIG. 2, the passenger D seated on the seat cushion 14 of the vehicle seat 12 is configured so as to be restrained in the vehicle seat 12 by a seatbelt 22 provided at a seatbelt device 20. The seatbelt device 20 is a three-point seatbelt device, and is a so-called seat-attached seatbelt device in which a non-illustrated retractor and anchor, and a buckle, are each provided at the vehicle seat 12.

The airbag device 30 includes an airbag 32, a pair of inflators 44 (see FIG. 3), and a module case 46). The airbag 32 is normally housed in a folded-up state inside the module case 46 together with the pair of inflators 44. The module case 46 is formed in a hollow cuboidal shape. The module case 46 is disposed at a rear upper portion of the vehicle seat 12 (more specifically at a rear side of the headrest 18 at an upper side of the seatback 16), and is fixed to an upper edge of the seatback 16 or to a non-illustrated vehicle body.

The airbag 32 is configured so as to be supplied with gas from the pair of the inflators 44 and inflated and deployed (deployed and inflated) from the rear side to the front side of the vehicle seat 12 via at an upper side thereof. The airbag 32 includes front-rear chambers 34 and an airbag body 40. The front-rear chambers 34 include a left-right pair of front-rear extension portions 34A that extend along the front-rear direction via left and right sides of the head H of the passenger D, and a coupling portion 34B that connects front end portions of the pair of front-rear extension portions 34A together in a left-right direction. The airbag body 40 inflates and deploys at a rear side of the coupling portion 34B toward the passenger D side (rear side) delayed with respect to the front-rear chamber 34, so as to be disposed between the pair of front-rear extension portions 34A and at a front side of the passenger D.

Figure 3:
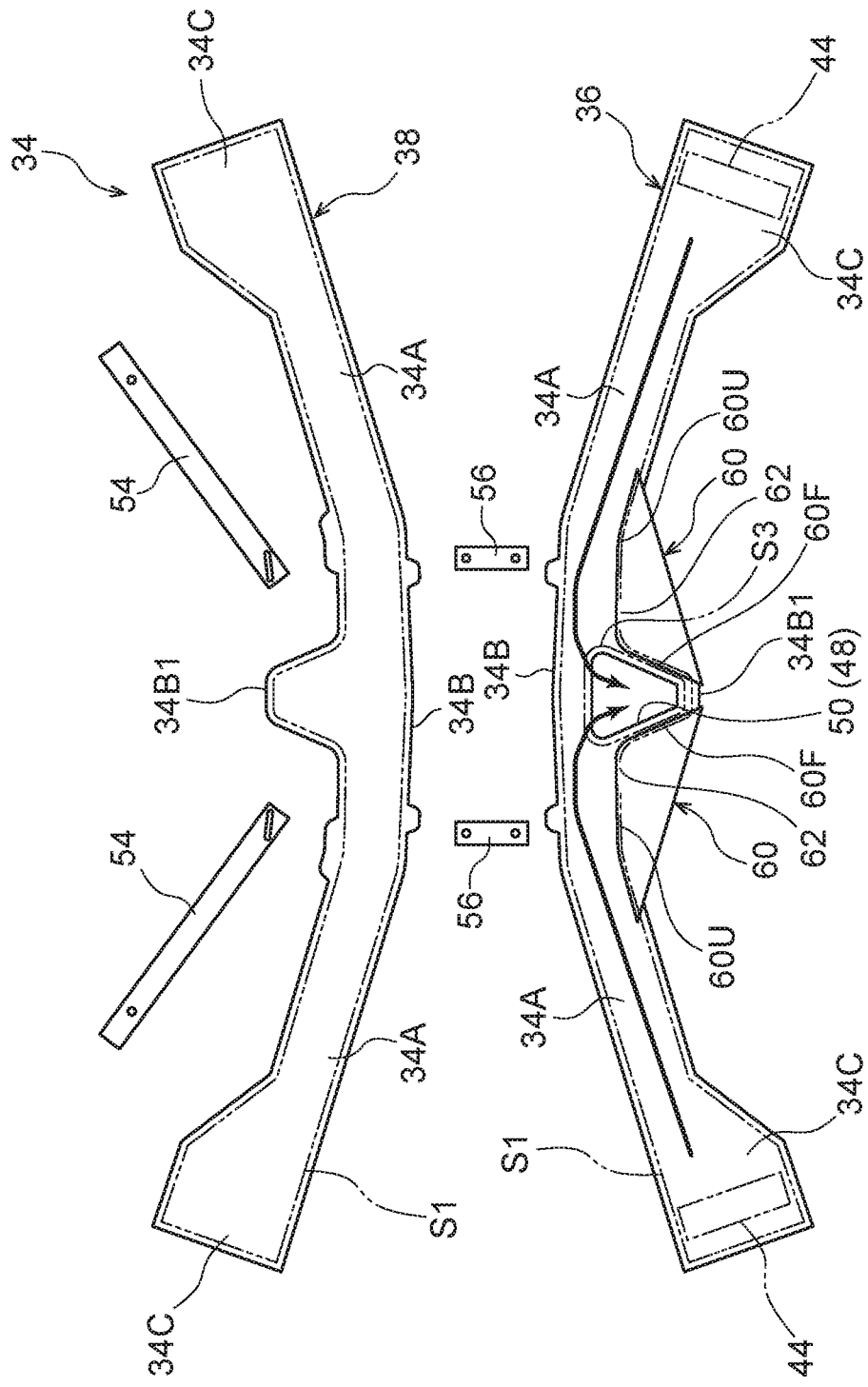
FIG. 3 illustrates an opened out view of a front-rear chamber configuring an airbag of an airbag device according to the first exemplary embodiment.
Figure 4:
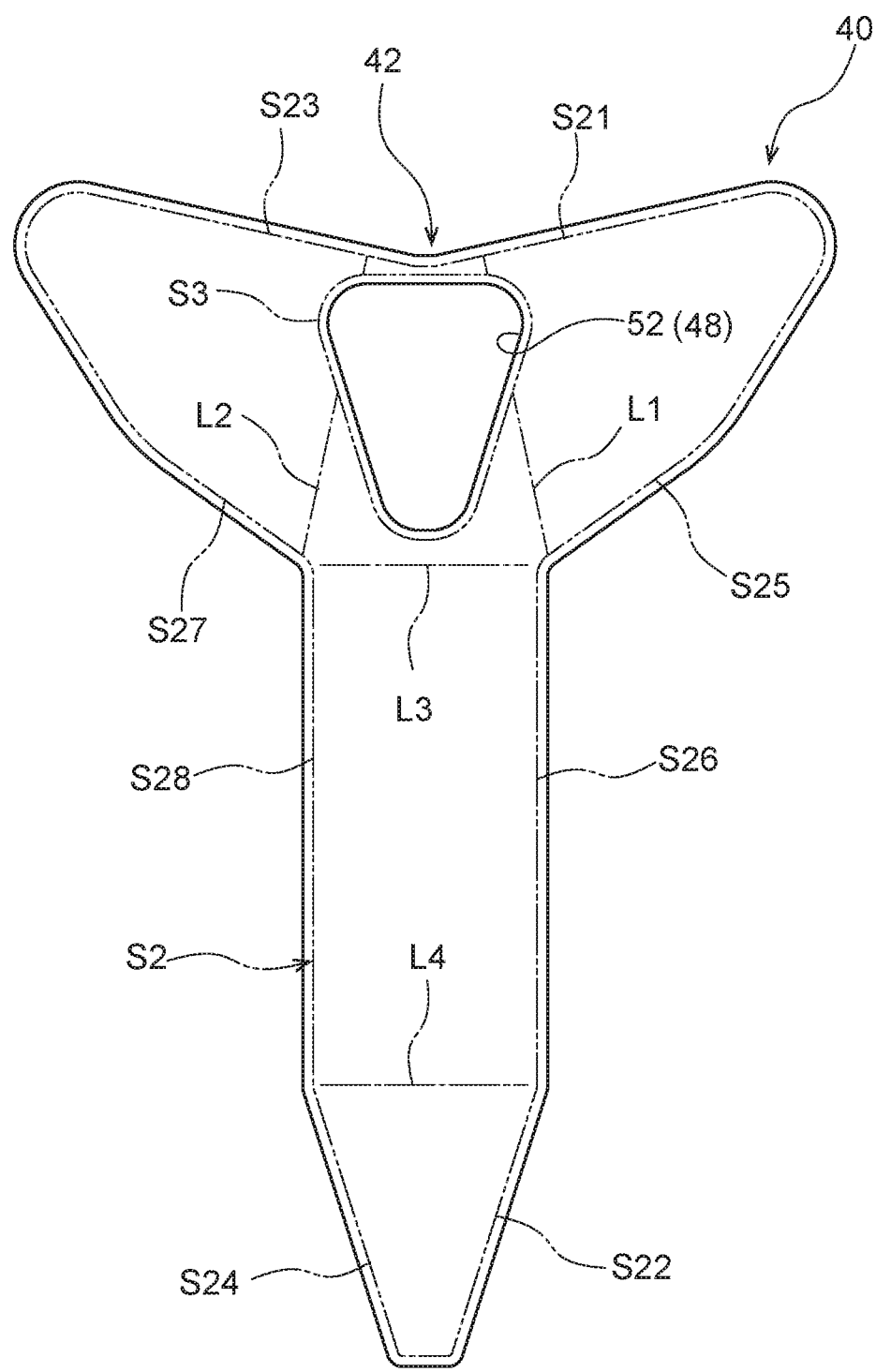
FIG. 4 is an opened out view of an airbag body configuring an airbag of an airbag device according to the first exemplary embodiment.

As illustrated in FIG. 3, the front-rear chamber 34 is formed in an elongated bag shape by overlapping base cloth 36, 38 serving as two elongated front-rear chamber panels, and sewing peripheral edges thereof together along a sewn portion S1. Moreover, as illustrated in FIG. 4, the airbag body 40 is formed in a bag shape by folding a base cloth 42 serving as an single airbag body panel along four fold lines L1, L2, L3, L4 and sewing along a sewn portion S2.

At the sewn portion S2, a sewing line S21 is sewn to a sewing line 522, a sewing line S23 is sewn to a sewing line 524, a sewing line S25 is sewn to a sewing line 526, and a sewing line S27 is sewn to a sewing line 528. Note that the base cloths 36, 38, 42 are, for example, configured by a polyamide- or polyester-based fabric. One or both out of the two base cloths 36, 38 configuring the front-rear chamber 34 is a base cloth that is less extensible than the base cloth 42 configuring the airbag body 40.

As illustrated in FIG. 3, the length direction two end portions (rear end portions of the pair of front-rear extension portions 34A) of the front-rear chamber 34 configure a pair of inflator housing portions 34C housing the left-right pair of inflators 44. Namely, a length direction central portion of the front-rear chamber 34 (a portion connecting the front end portions of the pair of front-rear extension portions 34A together in the left-right direction) is configured by the coupling portion 34B, with the respective front-rear extension portions 34A disposed between the coupling portion 34B and the pair of inflator housing portions 34C.

Although omitted in the drawings, the airbag device 30 includes a control device (ECU) for controlling actuation of the pair of inflators 44. The control device is electrically connected to the pair of inflators 44 and to a non-illustrated crash sensor (including a camera or the like), and is configured so as to be able to detect a head-on collision of the vehicle or foresee that a head-on collision is inevitable (hereafter referred to as "predict"). The control device is configured so as to actuate the pair of inflators 44 when a head-on collision of the vehicle is detected or predicted based on information from the crash sensor.

The pair of inflators 44 are, for example, combustion type cylinder inflators, configured so as to generate gas at high temperature on actuation by the control device during a vehicle head-on collision. Note that the form of vehicle head-on collision for which the control device actuates the inflators 44 includes, in addition to a full frontal head-on collision, an offset head-on collision, such as an oblique collision or a small overlap collision or the like.

The pair of inflator housing portions 34C housing the pair of inflators 44 are disposed separated from each other at the left and right sides inside the module case 46. Each of the inflators 44 housed inside the respective inflator housing portions 34C is disposed with an axial direction orientated along the height direction of the seatback 16. An upper and lower pair of stud bolts (omitted in the drawings) are, for example, provided at each of the inflators 44.

The pair of stud bolts are inserted through the inflator housing portions 34C, the module case 46, and through a non-illustrated frame of the seatback 16, and nuts (omitted in the drawings) are screwed onto the respective stud bolts. The inflator housing portions 34C, the inflators 44, and the module case 46 are thereby fixed to the frame of the seatback 16.

The pair of front-rear extension portions 34A are each formed in an elongated tube shape. An enlarged portion 34B1 is integrally formed to a left-right direction central portion of the coupling portion 34B, with the enlarged portion 34B1 projecting further downward than the left-right direction two end portions of the coupling portion 34B connected to the pair of front-rear extension portions 34A. Namely, the coupling portion 34B is formed as a substantially T-shaped bag communicated with the front-rear extension portions 34A. A configuration is adopted in which a communication hole 48 is provided at a rear side of the left-right direction central portion of the coupling portion 34B including the enlarged portion 34B1.

Namely, a sewn portion S3 is formed by sewing around a periphery of a through hole 50 formed in the base cloth 36 of the front-rear chamber 34 and around a periphery of a through hole 52 (see FIG. 4) formed in the base cloth 42 of the airbag body 40, with the communication hole 48 formed so as to communicate between the through hole 50 and the through hole 52. Note that the through hole 50 and the through hole 52 are, as an example, formed in substantially inverted trapezoidal shapes. This means that the sewn portion S3 is, as an example, also formed in a substantially inverted trapezoidal shape, such that the communication hole 48 communicating the inside of the coupling portion 34B with the inside of the airbag body 40 is positioned at the inside of the sewn portion S3.

The pair of front-rear extension portions 34A, the coupling portion 34B, and the airbag body 40 are normally housed folded up inside the module case 46 with a specific folding pattern, such as roll folding, concertina folding, or the like. A non-illustrated tear line is formed to the module case 46. The tear line is configured so as to rupture on receipt of inflation pressure of the airbag 32 when the airbag 32 is being inflated and deployed. This means that the airbag 32 is able to be inflated and deployed toward the outside of the module case 46 in a sequence of the pair of front-rear extension portions 34A, then the coupling portion 34B, and then the airbag body 40.

The inflated and deployed pair of front-rear extension portions 34A extend in the front-rear direction at the left and right sides of the head H of the passenger D, so as to oppose the head H from the left and right sides thereof, separated from the head H by respective gaps. The front end portions of the inflated and deployed pair of front-rear extension portions 34A are in a state connected together in the left-right direction by the inflated and deployed coupling portion 34B. This means that the front-rear chamber 34 including the pair of front-rear extension portions 34A and the coupling portion 34B is configured in a substantially U-shape open toward the rear in plan view (see FIG. 1).

The airbag body 40 is configured so as to be supplied with gas through the communication hole 48 and inflated and deployed toward the rear side (the passenger D side). Namely, the airbag body 40 is configured so as to be inflated and deployed at the rear side of the coupling portion 34B toward the passenger D side (rear side) delayed with respect to the front-rear chamber 34. The airbag body 40 is thereby configured so as to be able to pass through from the rear side toward the front side via a gap between the head H of the passenger D and a ceiling 28 of a vehicle cabin (see FIG. 5) during inflation and deployment of the front-rear chamber 34.

Figure 8:
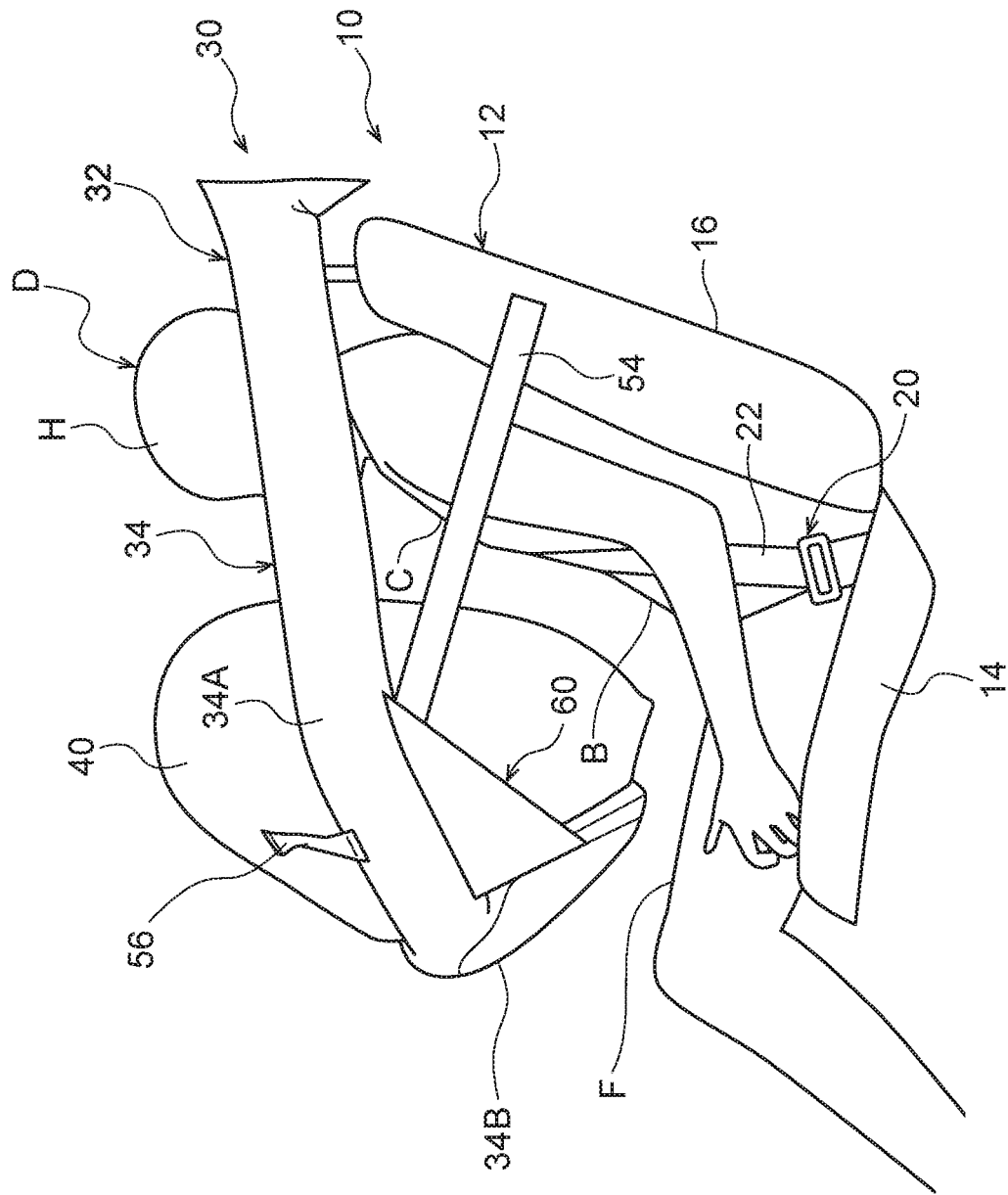
FIG. 8 is a schematic side view illustrating a time just before passenger restraint by an airbag of an airbag device according to the first exemplary embodiment.

The inflated and deployed airbag body 40 is configured so as to face toward the head H, the neck N, the chest C, and the belly B of the passenger D, separated by a gap therefrom in the front-rear direction (see FIG. 8). Note that the airbag body 40 is set with a shape such that when being inflated and deployed, the airbag body 40 is sandwiched between the thighs F and the chest C of the passenger D from an intermediate-stage to a later-stage during passenger restraint.

Moreover, as illustrated in FIG. 1 and FIG. 2, a left and right pair of rear tethers 54 and a left and right pair of front upper tethers 56 are attached to the airbag 32. The rear tethers 54 and the front upper tethers 56 are, for example, configured in rectangular belt shapes from a polyamide- or polyester-based fabric. The fabric configuring the rear tethers 54 and the front upper tethers 56 is configured so as to be less extensible than the base cloths 36, 38 configuring the front-rear chamber 34 and the base cloth 42 configuring the airbag body 40. The extensibility is adjusted by the substance, thickness, and the like of the fabric.

The pair of front upper tethers 56 are configured so as to couple wall faces at the left and right sides of a front side of an upper portion of the airbag body 40 inflated and deployed further upward than the front-rear chamber 34, to respective front portions of the pair of front-rear extension portions 34A. Namely, respective one-end portions of the pair of front upper tethers 56 are sewn to wall faces of the left and right sides of the front side of the upper portion of the airbag body 40 inflated and deployed further upward than the front-rear chamber 34. Each of the other-end portions of the pair of front upper tethers 56 is sewn to the front portions of the pair of respective front-rear extension portions 34A.

Each of one-end portions of the pair of rear tethers 54 is attached to the airbag body 40 by being sewed to the respective wall faces on the left and right sides at a front side of a lower portion of the airbag body 40 inflated and deployed further downward than the front-rear chamber 34. Each of the other-end portions of the pair of rear tethers 54 is attached to respective side portions of the seatback 16 (or to a non-illustrated vehicle body at a rear side of the passenger D). Thus in an inflated and deployed state of the airbag 32, the pair of rear tethers 54 extend obliquely rearward and downward at a lower side of the pair of front-rear extension portions 34A.

Namely, the pair of rear tethers 54 adopt an inclined orientation inclined facing rearward and downward in side view. This results in a configuration in which, during restraint of the passenger D by the airbag 32, the airbag body 40 is drawn in (pulled) relatively rearward and downward by the pair of rear tethers 54, and the airbag body 40 and front portions of the pair of front-rear extension portions 34A are drawn in relatively rearward and downward about a center of rotation of the module case 46.

As illustrated in FIG. 1 to FIG. 3, a left and right pair of auxiliary chambers 60 having a specific size are attached to the front-rear chamber 34 (the front portions of the front-rear extension portions 34A) of the airbag 32. The auxiliary chambers 60 are, for example, configured from a polyamide- or polyester-based fabric with a substantially triangular bag shape in side view having left-right symmetrical shapes to each other. Note that the fabric configuring the auxiliary chambers 60 is configured so as to be more extensible than the base cloths 36, 38 configuring the front-rear chamber 34 and the base cloth 42 configuring the airbag body 40 in order to be able to receive gas that would ordinarily be externally exhausted. The extensibility is adjusted by the substance, thickness, and the like of the fabric.

The pair of auxiliary chambers 60 span between left and right end portions of the coupling portion 34B and front portions of the pair of front-rear extension portions 34A. Namely, peripheral edge portions 60F at the front side of the pair of auxiliary chambers 60 are respectively sewn to the left and right end portions of the coupling portion 34B. Peripheral edge portions 60U at the upper side of the pair of auxiliary chambers 60 are, except at a seat width direction inside end portion thereof, respectively sewn to front portions of the pair of front-rear extension portions 34A. The auxiliary chambers 60 are accordingly configured so as to be coupled to the airbag body 40 through the coupling portion 34B and to the pair of front-rear extension portions 34A.

Unsewn seat width direction inside end portions at the peripheral edge portions 60U at the upper side of the auxiliary chambers 60 are configured as inflow ports 62 for inflow of gas at high temperature flows (indirectly) from inside the airbag body 40 through the coupling portion 34B and the pair of front-rear extension portions 34A at least during restraint of the passenger D by the airbag body 40.

Namely, on the front portions of the pair of front-rear extension portions 34A, at portions corresponding to the seat width direction inside end portions of the peripheral edge portions 60U at the upper side of the auxiliary chambers 60, one of the base cloths configuring the auxiliary chamber 60 is sewn to the base cloth 36 of the front-rear chamber 34, and the other of the base cloths configuring the auxiliary chamber 60 is sewn to the base cloth 38 of the front-rear chamber 34. However, the base cloth 36 and the base cloth 38 are not sewn together at this portion. The inflow ports 62 are accordingly formed at these portions. Note that the size of the inflow ports 62 is set so as to be much smaller than the communication hole 48.

Next, description follows regarding operation and effects of the airbag device 30 and the passenger protection device 10 according to the first exemplary embodiment configured as described above.

The pair of inflators 44 are actuated under control from the control device when a vehicle head-on collision is detected (or predicted) by the crash sensor. Namely, gas is ejected from each of the inflators 44 into the pair of inflator housing portions 34C. The gas generated inside the pair of inflator housing portions 34C flows to the coupling portion 34B side via the pair of front-rear extension portions 34A, and is supplied into the airbag body 40 via the communication hole 48.

Figure 5:
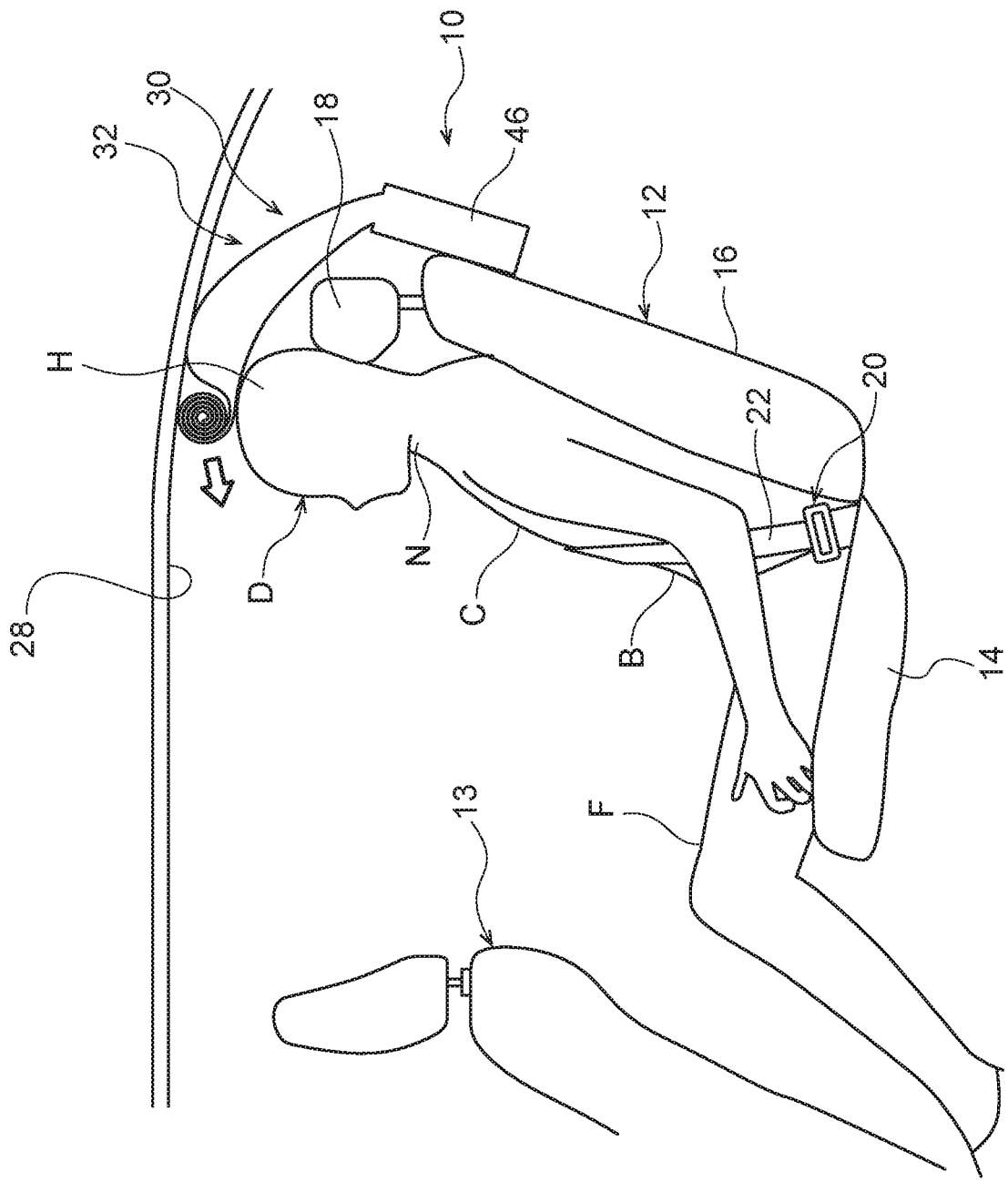
FIG. 5 is a schematic side view illustrating a state when an airbag of an airbag device according to the first exemplary embodiment passes through a gap between the head of a passenger and a ceiling of a vehicle cabin while inflating and deploying.

More specifically first, as illustrated in FIG. 5, the tear line of the module case 46 ruptures under receipt of inflation pressure of the airbag 32, and the airbag 32 inflates and deploys from the rear side of the vehicle seat 12 toward the front side via an upper side thereof (as indicated by an arrow). Namely, the airbag 32 deploys from a rear upper portion of the seatback 16 toward the front side via an upper side of the headrest 18 and an upper side of the head H of the passenger D.

Figure 6:
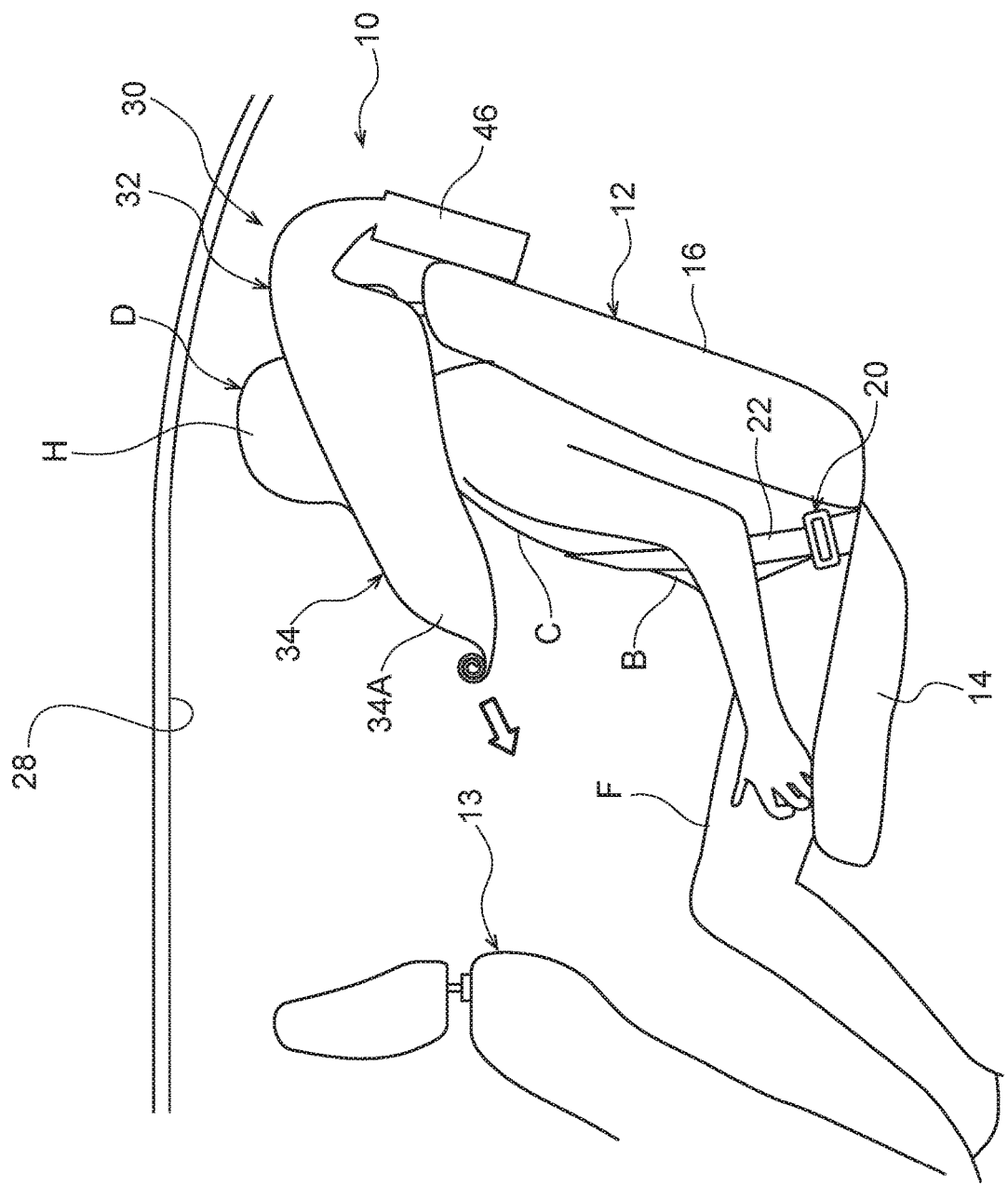
FIG. 6 is a schematic side view illustrating a state when an airbag of an airbag device according to a first exemplary embodiment passes the shoulders a passenger while inflating and deploying.
Figure 7:
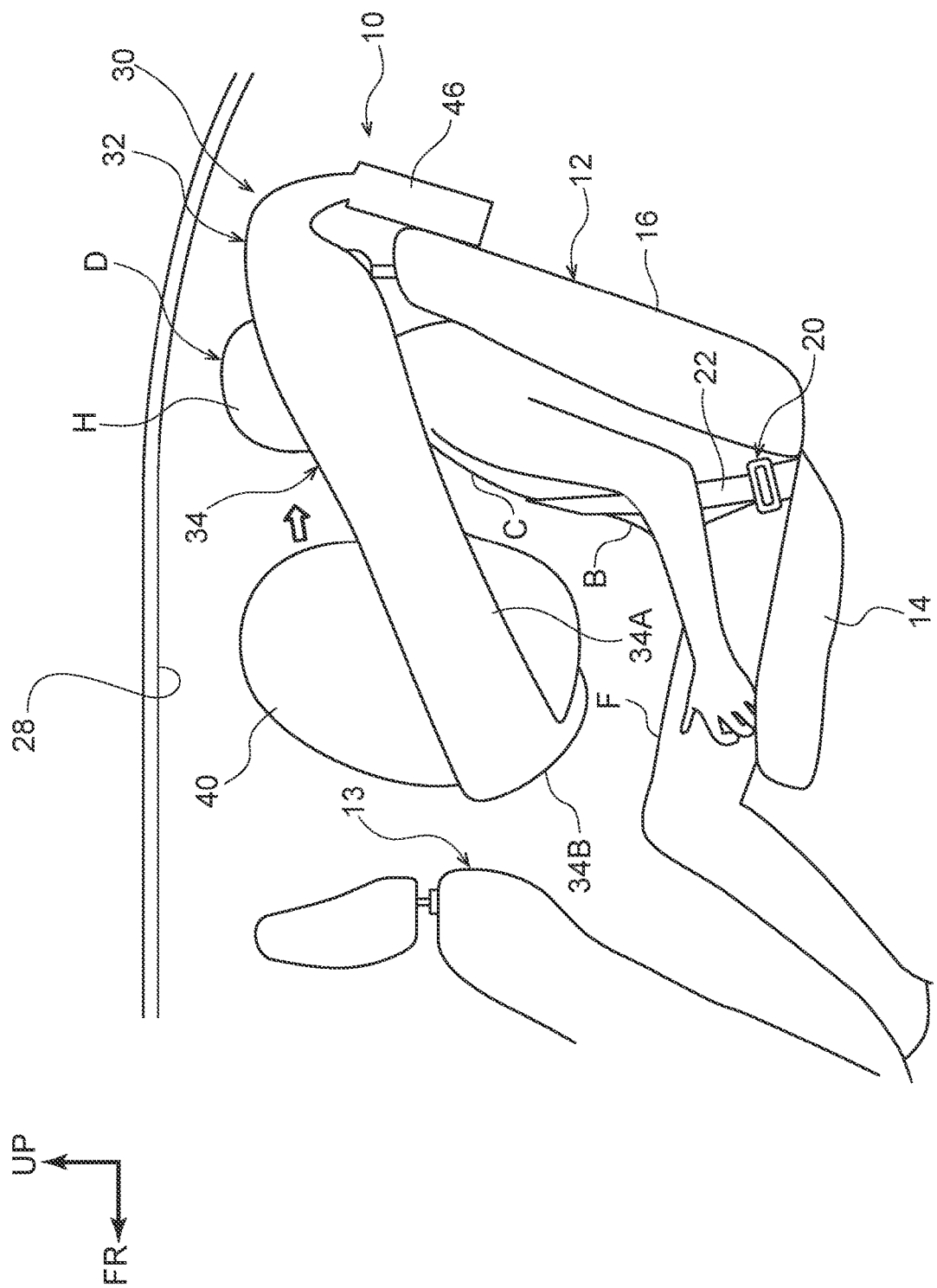
FIG. 7 is a schematic side view illustrating a state when an airbag of an airbag device according to the first exemplary embodiment has become disposed at a front side of a passenger while inflating and deploying.

Next, as illustrated in FIG. 6, the head H of the passenger D is inserted relatively into a space surrounded by the pair of front-rear extension portions 34A of the front-rear chamber 34 and by the airbag body 40 (see FIG. 7). Namely, the pair of front-rear extension portions 34A of the front-rear chamber 34 are deployed toward the front side (as indicated by the arrow) while being disposed at the left and right sides of the head H of the passenger D.

Then, as illustrated in FIG. 7, the airbag body 40 is inflated and deployed toward the passenger D side (rear side as indicated by an arrow) by being supplied with gas through the coupling portion 34B connecting the front end portions of the pair of front-rear extension portions 34A of the front-rear chambers 34 together in the left-right direction. Namely, as illustrated in FIG. 8, the airbag body 40 is disposed between the pair of front-rear chambers 34 and at the front side of the passenger D.

Note that during inflation and deployment of the airbag body 40, the pair of front upper tethers 56 respectively couple left-right side locations at the front side of an upper portion of the airbag body 40 to the front portions of the pair of front-rear extension portions 34A. The pair of front upper tethers 56 enable unintended upward displacement (rotation) of the airbag body 40 with respect to the front-rear chamber 34 about the coupling portion 34B to be suppressed when the airbag body 40 (the airbag 32) has been completely inflated and deployed.

The pair of rear tethers 54 also extend obliquely rearward and downward at a lower side of the pair of front-rear extension portions 34A when the airbag 32 has been completely inflated and deployed. Namely, the pair of rear tethers 54 limit the airbag body 40 from moving obliquely forward and upward. This accordingly enables the airbag 32 to be suppressed from swinging in the height direction and in the front-rear direction (contributes to the stability of the deployment behavior of the airbag body 40).

Figure 9:
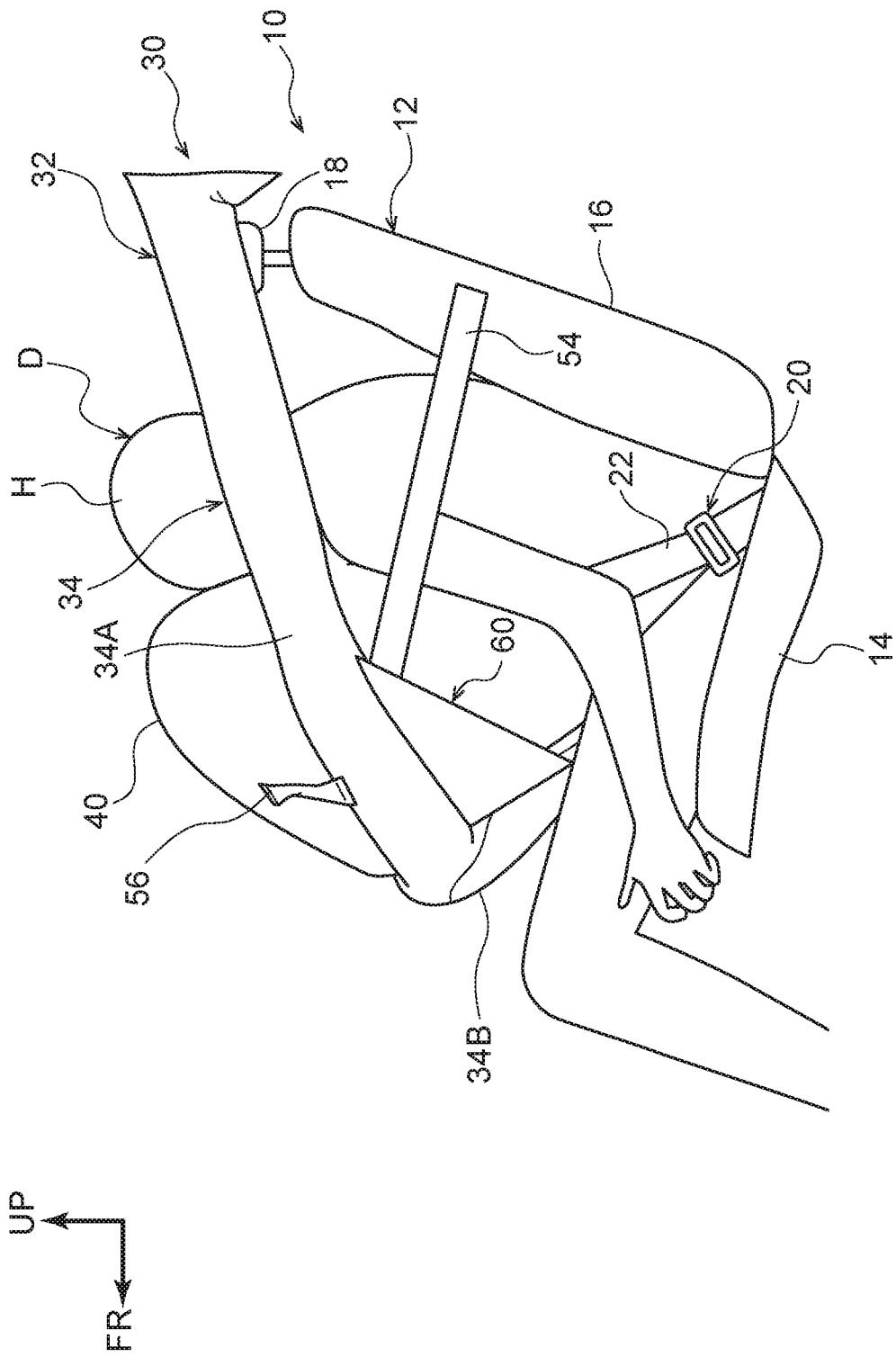
FIG. 9 is a schematic side view illustrating a time at an initial-stage of passenger restraint by an airbag of an airbag device according to the first exemplary embodiment.
Figure 10:
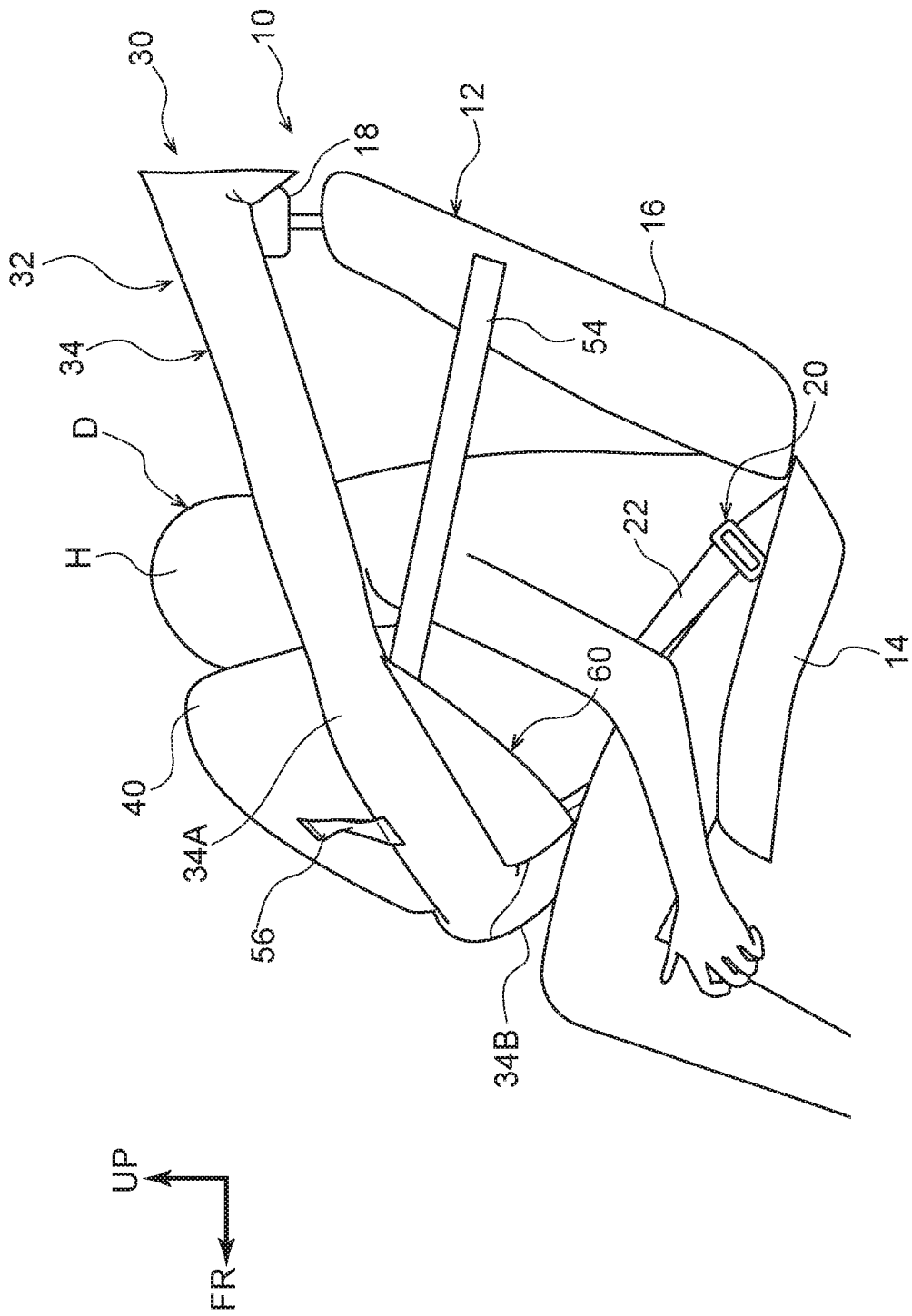
FIG. 10 is a schematic side view illustrating a time at an intermediate-stage of passenger restraint by an airbag of an airbag device according to the first exemplary embodiment.
Figure 11:
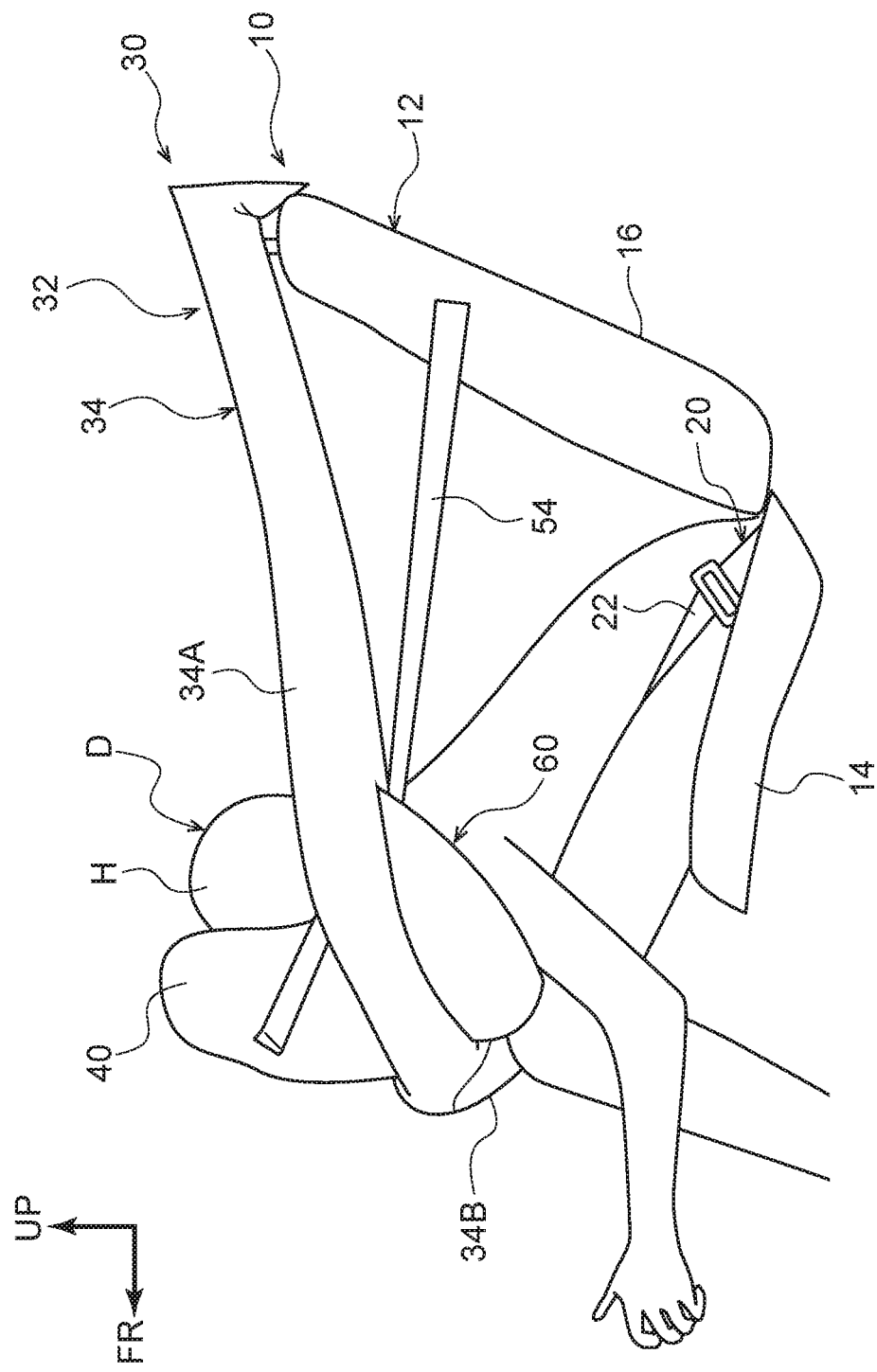
FIG. 11 is a schematic side view illustrating a time at a later-stage of passenger restraint by an airbag of an airbag device according to the first exemplary embodiment.

In this state, as illustrated in FIG. 9, the passenger D who has moved toward the front side under inertia from the impact of the vehicle head-on collision is restrained by the airbag body 40. More specifically, as illustrated in FIG. 10, during restraint of the passenger D, the front-rear chamber 34 (the front-rear extension portions 34A) are stretched toward the front side by the passenger D moving toward the front side. Then, as illustrated in FIG. 11, the airbag body 40 is compression deformed toward the front side by being pressed toward the front side by the passenger D.

This accordingly enables the energy absorption performance of the airbag body 40 to be improved. Namely, in cases in which both the front-rear chamber 34 and the airbag body 40 receive tension load, the load from the airbag body 40 imparted to the passenger D increases continuously with time, however the load imparted to the passenger D can be decreased somewhat by compression deformation of the airbag body 40.

Moreover, the airbag body 40 is set with a shape so as to be sandwiched between the thighs F and the chest C of the passenger D from an intermediate-stage to a later-stage during passenger restraint by the airbag 32, and so this enables contact with the upper body of the passenger D over a wide surface area. The load from the airbag body 40 imparted to the passenger D can accordingly be reduced significantly.

The airbag body 40 is also inflated and deployed toward the passenger D side at the rear side of the coupling portion 34B after the inflation and deployment of the front-rear chamber 34, and so a gap between the airbag body 40 and the passenger D becomes small. The passenger D is thereby restrained at an early-stage by the airbag body 40, enabling the initial-stage passenger D restraint performance by the airbag body 40 to be improved.

Moreover, gas is supplied from the inflators 44 into the airbag body 40 through the communication hole 48 formed at the rear side of the left-right direction central portion of the coupling portion 34B in an inflated and deployed state of the front-rear chamber 34. Namely, gas that was ejected from the inflators 44 and flowed into the pair of front-rear extension portions 34A of the front-rear chamber 34 and the coupling portion 34B is supplied into the airbag body 40 via the communication hole 48.

This thereby enables the airbag body 40 to be inflated and deployed sufficiently delayed with respect to the front-rear chamber 34. Namely, the airbag body 40 can be easily inflated and deployed toward the rear side after passing from the rear side to the front side via the narrow gap between the head H of the passenger D and the ceiling 28 of the vehicle cabin due to the inflation and deployment of the front-rear chamber 34 (see FIG. 5 to FIG. 7). The airbag body 40 getting stuck in the narrow gap is thereby able to be prevented, enabling a deployment malfunction with the airbag 32 to be suppressed or prevented from occurring.

Moreover, the airbag 32 includes the auxiliary chambers 60 into which high temperature gas flows from the airbag body 40 through the coupling portion 34B, the front ends of the pair of front-rear extension portions 34A, and the inflow ports 62, at least when the passenger D is being restrained by the airbag body 40. This means that even without setting vent holes for external exhausting of gas, gas from inside the airbag body 40 is able to be discharged (escape) into the auxiliary chambers 60 through the coupling portion 34B, the front ends of the pair of front-rear extension portions 34A, and the inflow ports 62. This enables the passenger restraint performance to be raised. Moreover, due to high temperature gas not being externally exhausted, there is also no concern about the passenger D suffering burns.

Moreover, the auxiliary chambers 60 are provided as a left-right symmetrically shaped pair with substantially triangular shapes in side view, and couple the airbag body 40 to the pair of front-rear extension portions 34A through the coupling portion 34B. This accordingly enables swinging of the airbag body 40 in the height direction to be suppressed by the auxiliary chambers 60 when the airbag body 40 has been completely deployed.

The size of the inflow ports 62 is also set so as to be much smaller than the communication hole 48. This means that it is more difficult for gas to flow from inside the airbag body 40 into the auxiliary chambers 60 through the coupling portion 34B, the front ends of the pair of front-rear extension portions 34A, and the inflow ports 62, enabling an inflow balance of gas flowing into the auxiliary chambers 60 to be regulated. Namely, this enables suppression or prevention of a malfunction that might occur were the auxiliary chambers 60 to be inflated and deployed prior to the airbag body 40 being inflated and deployed.

The airbag 32 is configured by the two base cloths 36, 38 that have been sewn together except at the portion where the inflow ports 62 are formed, and that have been sewn together with the peripheral edge portions 60F, 60U of the pair of auxiliary chambers 60, and by the single base cloth 42 sewn to the coupling portion 34B. This enables a simple configuration and low cost manufacture even for the airbag 32 provided with the auxiliary chambers 60.

Second Exemplary Embodiment

Next, description follows regarding a second exemplary embodiment. Note that the same reference numerals will be appended to locations equivalent to those of the first exemplary embodiment and detailed explanation thereof will be omitted (including of common operation and effects).

Figure 12:
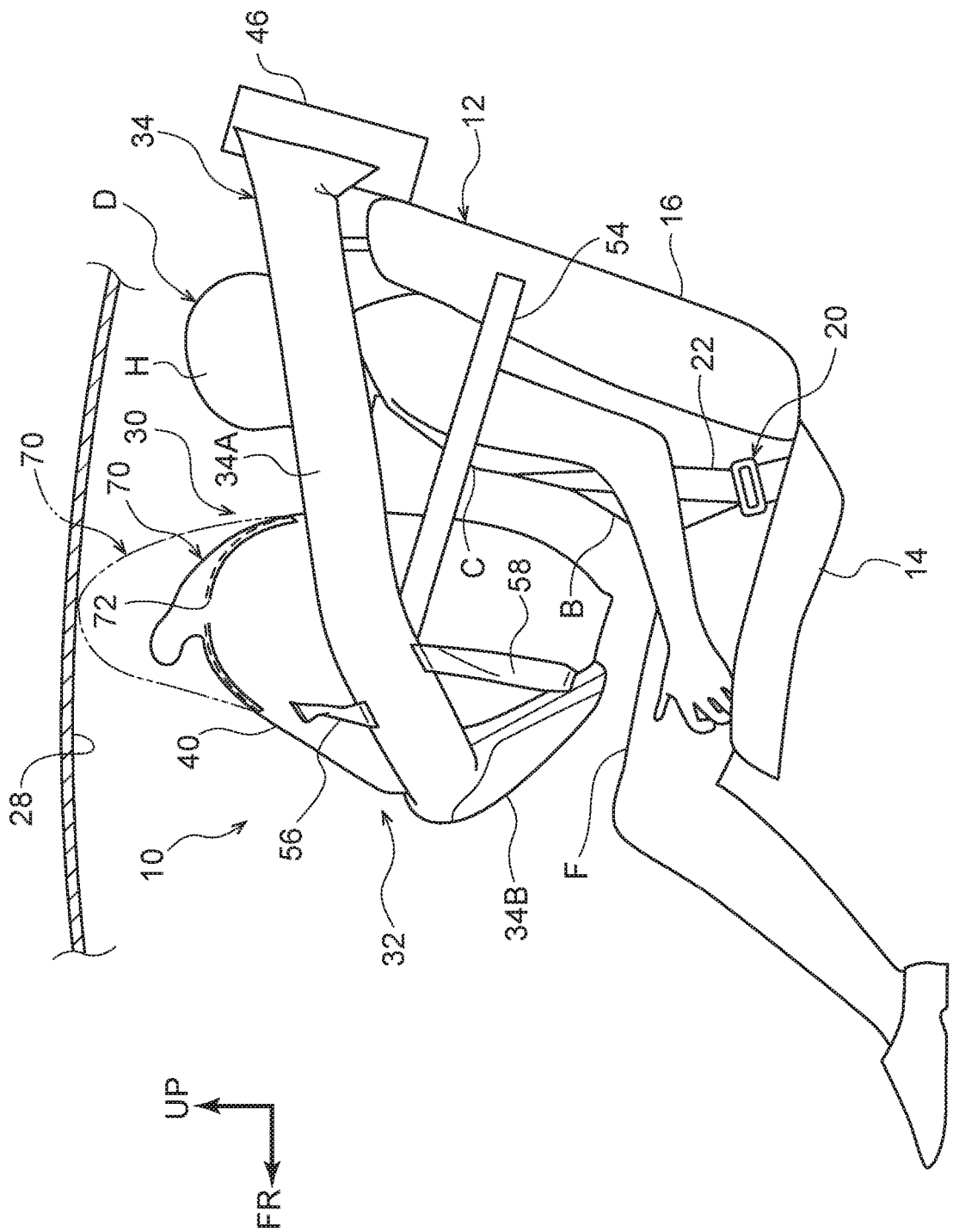
FIG. 12 is a schematic side view illustrating after complete inflation and deployment of an airbag of an airbag device according to a second exemplary embodiment.

As illustrated in FIG. 12, a left-right pair of front-lower tethers 58 are attached to the airbag 32 of the second exemplary embodiment. The front-lower tethers 58 are also, for example, configured in rectangular belt shapes from a polyamide- or polyester-based fabric. Moreover, the fabric configuring the front-lower tethers 58 is configured so as to be less extensible than the base cloths 36, 38 configuring the front-rear chamber 34 and the base cloth 42 configuring the airbag body 40. The extensibility is adjusted by the substance, thickness, and the like of the fabric.

The pair of front-lower tethers 58 are configured so as to couple wall faces at the left and right sides of a front side of a lower portion of the airbag body 40 inflated and deployed further downward than the front-rear chamber 34, to respective front portions of the pair of front-rear extension portions 34A. Namely, each of the one-end portions of the pair of front-lower tethers 58 is sewn to the respective wall faces at the left and right sides of the lower portion of the airbag body 40 inflated and deployed further downward than the front-rear chamber 34. Each of the other-end portions of the pair of front-lower tethers 58 is sewn to the front end portions of the pair of respective front-rear extension portions 34A.

Thus during inflation and deployment of the airbag body 40, the pair of front-lower tethers 58 couple locations at the left-right side of a front side of the lower portion of the airbag body 40 to the front end portions of the pair of front-rear extension portions 34A. This means that the pair of front-lower tethers 58 are able to suppress unintended downward displacement (rotation) of the airbag body 40 with respect to the front-rear chamber 34 about the coupling portion 34B when the airbag body 40 (the airbag 32) has been completely inflated and deployed.

Figure 13:
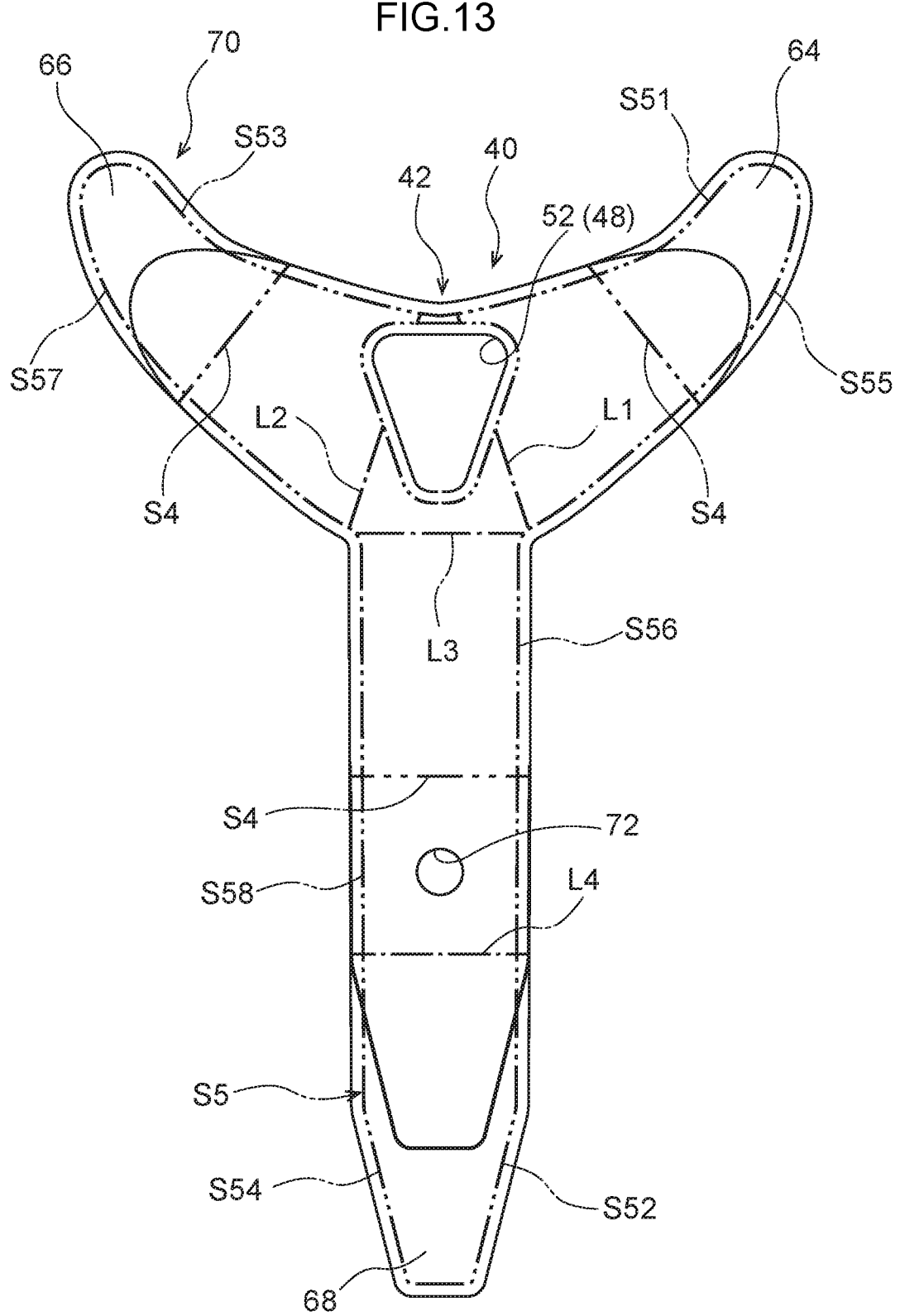
FIG. 13 is an opened out view of an airbag body configuring an airbag of an airbag device according to the second exemplary embodiment.

Moreover, an auxiliary chamber 70 having a specific size is provided at an upper portion of the airbag body 40 so as to oppose the ceiling 28 of the vehicle cabin in the height direction. Namely, the airbag 32 is, as described above, configured including the two base cloths 36, 38 that have been sewn together, the single base cloth 42 sewn to the coupling portion 34B and, as illustrated in FIG. 13, by the base cloths 64, 66, 68 serving as three auxiliary chamber panels that are sewn along sewn portions S4 so as to respectively extend the base cloth 42 (so as to enlarge the base cloth 42).

The auxiliary chamber 70 is configured so as to be formed in a bag shape by the base cloths 64, 66, 68 being sewn along the sewn portion S5. At the sewn portion S5, a sewing line S51 is sewn to a sewing line S52, a sewing line S53 is sewn to a sewing line S54, a sewing line S55 is sewn to a sewing line S56, and a sewing line S57 is sewn to a sewing line S58.

The fabric of the base cloths 64, 66, 68 configuring the auxiliary chamber 70 is configured more extensible than the base cloths 36, 38 configuring the front-rear chamber 34 and the base cloth 42 configuring the airbag body 40 in order to be able to receive gas that would ordinarily be externally exhausted. The extensibility is adjusted by the substance, thickness, and the like of the fabric. An inflow port 72 that is circular shaped small hole is formed at a central portion of an area of the base cloth 42 overlapping with the base cloth 64 (apex of the airbag body 40 when inflated and deployed), with the inflow port 72 communicating the airbag body 40 with the auxiliary chamber 70.

This means that high temperature gas inside the airbag body 40 flows directly from inside the airbag body 40 into the auxiliary chamber 70 through the inflow port 72, at least when the passenger D is being restrained by the airbag body 40. Thus even without setting vent holes for external exhausting of gas, gas from inside the airbag body 40 is able to be discharged (escape) into the auxiliary chamber 70, enabling the passenger restraint performance to be raised. Moreover, due to the high temperature gas not being externally exhausted, there is no concern that the passenger D might suffer burns.

Furthermore, the size of the inflow port 72 is set so as to be much smaller than the communication hole 48. This means that an inflow balance of gas flowing from inside the airbag body 40 into the auxiliary chamber 70 through the inflow port 72 can be regulated. Namely, this enables suppression or prevention of a malfunction that might occur were the auxiliary chamber 70 to be inflated and deployed prior to the airbag body 40 being inflated and deployed.

The inflow port 72 is formed at a central portion of an area of the base cloth 42 overlapping with the base cloth 64 (an area between sewn portion S4 and fold line L4 in FIG. 13). Namely as illustrated in FIG. 12, the inflow port 72 is formed at the apex of the airbag body 40 when inflated and deployed. There is accordingly no concern that the inflow port 72 might be occluded by the passenger D or a front seat 13 (see FIG. 5 to FIG. 7).

The apex of the auxiliary chamber 70 is configured so as to abut the ceiling 28 of the vehicle cabin by the auxiliary chamber 70 being inflated by gas flowing in from the inflow port 72 (see the double-dash broken line in FIG. 12), at least when the passenger D is being restrained by the airbag body 40. The auxiliary chamber 70 thereby enables the airbag body 40 to be suppressed from swinging in the height direction of the airbag body 40 during passenger D restraint.

Moreover, as described above, the airbag 32 is configured by the two base cloths 36, 38 that have been sewn together, the single base cloth 42 that is sewn to the coupling portion 34B, and the three base cloths 64, 66, 68 that are sewn to the base cloth 42. This enables a simple configuration and low cost manufacture even for the airbag 32 provided with the auxiliary chamber 70.

Although the airbag device 30 and the passenger protection device 10 according to the present exemplary embodiment have been described with reference to the drawings, the airbag device 30 and the passenger protection device 10 according to the present exemplary embodiment are not limited to those illustrated in the drawings, and appropriate design changes may be made within a range not departing from the spirit of the present disclosure.

For example, instead of each of the one-end portions of the pair of rear tethers 54 being attached to the airbag body 40 at the respective wall faces on the left and right sides at a front side of a lower portion of the airbag body 40 inflated and deployed further downward than the front-rear chamber 34, each of the one-end portions may be attached by being sewn to a length direction central portion of the pair of front-rear extension portions 34A, and more specifically to each of the inflated and deployed front-rear extension portions 34A.

What is claimed is:

1. An airbag device, comprising:
   an inflator that generates gas during a vehicle collision; and
   an airbag that is supplied with gas generated by the inflator, and that inflates and deploys from a seat rear side of a vehicle seat toward a seat front side via a seat upper side, wherein, in an inflated and deployed state the airbag includes:
   a pair of front-rear chambers extending in a seat front-rear direction via left and right sides of the head of a passenger seated in the vehicle seat;
   an airbag body that is communicated with the pair of front-rear chambers and that is disposed at a seat front side of the passenger between the pair of front-rear chambers; and
   an auxiliary chamber into which gas inside the airbag body flows either directly or indirectly at least during restraint of the passenger by the airbag body.

2. The airbag device of claim 1, wherein:
   the front-rear chamber includes a pair of front-rear extension portions disposed at the left and right sides of the head of the passenger and a coupling portion that connects seat front side end portions of the pair of front-rear extension portions together in a seat width direction, and
   the airbag body is provided at the coupling portion so as to be inflated and deployed toward a seat rear side when supplied with the gas through a communication hole formed in the seat rear side of the coupling portion.

3. The airbag device of claim 2, wherein the auxiliary chamber is formed as a pair of left-right symmetrically shaped auxiliary chambers having substantially triangular shapes and provided between the pair of front-rear extension portions and the coupling portion.

4. The airbag device of claim 3, wherein the airbag includes two front-rear chamber panels that are sewn together and are also respectively sewn to respective peripheral edge portions of the pair of auxiliary chambers, and includes a single airbag body panel sewn to the coupling portion.

5. The airbag device of claim 2, wherein the auxiliary chamber is provided at an upper portion of the airbag body so as to oppose a ceiling of a vehicle cabin in a seat height direction.

6. The airbag device of claim 5, wherein the auxiliary chamber is configured so as to abut the ceiling at least during restraint of the passenger by the airbag body.

7. The airbag device of claim 5, wherein the airbag includes two front-rear chamber panels that are sewn together, a single airbag body panel sewn to the coupling portion, and three auxiliary chamber panels that are sewn to the airbag body panel.

8. A passenger protection device, comprising:
   a vehicle seat for a passenger to sit on; and
   the airbag device of claim 1 installed at a location at a seat rear side of the vehicle seat.

* * * * *